United States Patent
Niglio et al.

(10) Patent No.: US 8,694,787 B2
(45) Date of Patent: Apr. 8, 2014

(54) APPARATUS AND METHOD FOR SECURING DIGITAL DATA WITH A SECURITY TOKEN

(76) Inventors: Christophe Niglio, San Francisco, CA (US); Karen Flannery, San Francisco, CA (US)

( * ) Notice: Subject to any disclaimer, the term of this patent is extended or adjusted under 35 U.S.C. 154(b) by 1169 days.

(21) Appl. No.: 12/184,856

(22) Filed: Aug. 1, 2008

(65) Prior Publication Data
US 2009/0044260 A1 Feb. 12, 2009

Related U.S. Application Data

(60) Provisional application No. 60/954,546, filed on Aug. 7, 2007.

(51) Int. Cl.
*H04L 29/06* (2006.01)

(52) U.S. Cl.
USPC ............... 713/172; 713/185; 713/159; 726/9; 726/20; 380/247

(58) Field of Classification Search
USPC ................... 320/103; 380/277, 239, 228, 247; 713/193, 168, 172; 709/223
See application file for complete search history.

(56) References Cited

U.S. PATENT DOCUMENTS

| | | | |
|---|---|---|---|
| 6,418,420 B1 * | 7/2002 | DiGiorgio et al. | 705/40 |
| 6,736,313 B1 | 5/2004 | Dickson | |
| 6,983,882 B2 | 1/2006 | Cassone | |
| 7,210,044 B2 * | 4/2007 | Lai et al. | 713/193 |
| 7,228,437 B2 * | 6/2007 | Spagna et al. | 713/193 |
| 7,762,470 B2 * | 7/2010 | Finn et al. | 235/492 |
| 7,822,200 B2 * | 10/2010 | Cameron et al. | 380/44 |
| 2003/0202661 A1 * | 10/2003 | Rodriguez et al. | 380/239 |
| 2004/0019571 A1 * | 1/2004 | Hurwitz et al. | 705/65 |
| 2004/0143730 A1 | 7/2004 | Wen et al. | |
| 2004/0215974 A1 * | 10/2004 | Conley et al. | 713/201 |
| 2006/0016872 A1 | 1/2006 | Bonalle et al. | |
| 2006/0034454 A1 | 2/2006 | Damgaard et al. | |
| 2006/0056625 A1 * | 3/2006 | Nakabayashi et al. | 380/46 |
| 2006/0069926 A1 | 3/2006 | Ginter et al. | |
| 2006/0083228 A1 | 4/2006 | Ong et al. | |
| 2007/0078959 A1 * | 4/2007 | Ye | 709/223 |
| 2008/0191878 A1 * | 8/2008 | Abraham | 340/572.1 |
| 2009/0051312 A1 * | 2/2009 | Simon et al. | 320/103 |
| 2009/0156126 A1 * | 6/2009 | Willis | 455/41.3 |
| 2009/0327102 A1 * | 12/2009 | Maniar et al. | 705/28 |

OTHER PUBLICATIONS

Steffen Hallsteinsen, Using the mobile phone as a security token for unified authentication, Aug. 2007, IEEE, N/A, 1-6 (all).*
International Search Report for International Application No. PCT/US08/72115 mailed Oct. 22, 2008.

* cited by examiner

*Primary Examiner* — Mohammad L Rahman
(74) *Attorney, Agent, or Firm* — Cooley LLP (57) ABSTRACT

A security token includes a wireless interface to communicate with a secured device. A cryptographic module generates cryptographic information, encrypts messages to the secured device, decrypts messages from the secured device and coordinates the encryption and decryption of data on the secured device.

19 Claims, 10 Drawing Sheets

APPARATUS AND METHOD FOR SECURING DIGITAL DATA WITH A SECURITY TOKEN

CROSS-REFERENCE TO RELATED APPLICATION

This application claims priority to U.S. Provisional Patent Application Ser. No. 60/954,546, filed Aug. 7, 2007, entitled "Portable Proximity Device and user Centric Methods for Data Security, Sign-On, Data Transaction, Audit, Reporting and Remote Control", the contents of which are incorporated herein by reference.

FIELD OF THE INVENTION

The invention relates generally to digital data security. More particularly, the invention relates to an apparatus and method for securing digital data through the use of a security token.

BACKGROUND OF THE INVENTION

Security tokens have been used for authenticating an individual's access to secure systems or devices, such as computers, handheld devices, mobile phones, smart phones and personal digital assistants (PDA). Security tokens may store cryptographic keys, a digital signature or biometric data to authorize a user's access to a secure device. Examples of security tokens include smart cards, Universal Serial Bus (USB) keys, biometric readers and one time password devices.

Existing security tokens are typically administered from a central authority. Thus, for example, an end user may not be able to invoke security functions unless access to a server is provided. The centralized control of such security functions limits the ability of individual users to deploy digital data security.

In view of the foregoing, it would be desirable to provide a security token that supports decentralized deployment of security functions and otherwise provides security, privacy and portability to secure data on digital devices.

SUMMARY OF THE INVENTION

A security token includes a wireless interface to communicate with a secured device. A cryptographic module generates cryptographic information, encrypts messages to the secured device, decrypts messages from the secured device and coordinates the encryption and decryption of data on the secured device.

A method of operating a wireless security token to secure data on a secured device includes generating encryption information, encrypting messages to the secured device, decrypting messages from the secured device and coordinating encryption and decryption of data on the secured device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
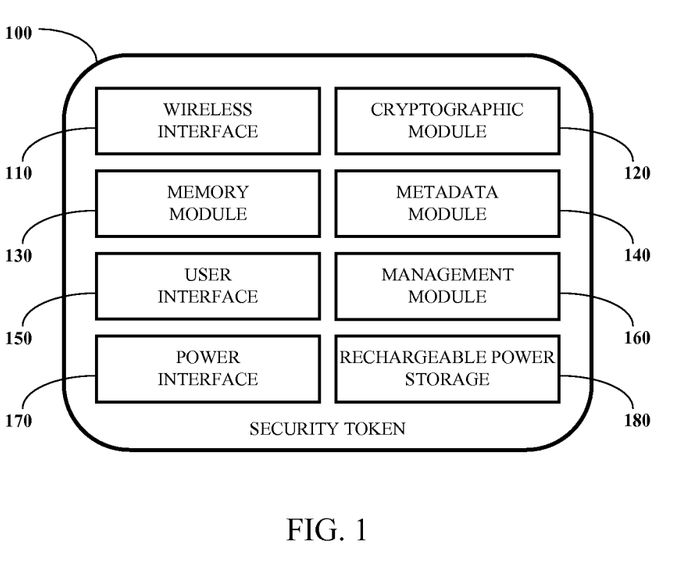
FIG. 1 illustrates components of a security token configured in accordance with one embodiment of the present invention.

FIG. 1 illustrates a security token 100 configured in accordance with an embodiment of the invention. The security token 100 includes a wireless interface 110, a cryptographic module 120, a memory module 130, a metadata module 140, a user interface 150, a management module 160, a power interface 170 and rechargeable power storage 180.

A secured device (not shown) communicates with the security token 100 through the wireless interface 110. In one embodiment, the wireless interface 110 is implemented using Bluetooth technology. The wireless interface 110 may also be selected based on the communication capabilities of the secured device and implemented using other technologies, including, but not limited to, RFID technology. In a particular embodiment, the communication range of the wireless interface 110 is up to two meters. If the security token 100 is beyond the communication range of the wireless interface 110, then the secured device automatically secures data to prevent unauthorized data access.

The metadata module 140 specifies one or more encryption parameters and creates metadata related to the security token 100. Metadata may include, for example, cryptographic information such as encryption keys and related information, information associated with the secured device, data and applications on the secured device, information associated with users of the secured device, synchronizing information such as time stamps and metadata directives used to control the security token or to control the protection of the secured device. Metadata values may be specified at the time of manufacture of the security token or modified during setup or operation of the security token 100 and are valid for a predetermined time period. In one embodiment, the expired metadata values are replaced with a set of default metadata values determined during setup and configuration of the security device or pre-defined by the expiring metadata. The metadata may further be encrypted and synchronized, as discussed below.

The cryptographic module 120 encrypts messages to the secured device and decrypts messages from the secured device. A message may include, but is not limited to, a key exchange, a cryptographic nonce, status information and metadata. The cryptographic module 120 generates cryptographic information, such as symmetric encryption keys and/or asymmetric encryption keys. In one embodiment, the asymmetric keys include Diffie-Hellman compatible key pairs and RSA compatible key pairs and the symmetric keys include AES compatible keys, such as a 128-bit AES key. The symmetric keys facilitate the encryption and decryption of communication messages to and from the secured device and the asymmetric keys secure the symmetric keys and facilitate the protection of the exchange of the symmetric keys. In one embodiment, the cryptographic module 120 is implemented using a Diffie-Hellman compatible protocol and is capable of generating 1024-bit RSA keys. In a particular embodiment, RSA compatible key pairs are used to secure relatively short messages and AES-128 key pairs are used to secure larger messages.

The cryptographic module 120 further coordinates the encryption and decryption of data on the secured device. As will be appreciated by those skilled in the art, data coordination is typically required for a variety of reasons, such as, to identify changing data characteristics pertaining to a user or device, to identify changing security policies pertaining to security tokens, secured devices or users or for detecting occasional availability and non-simultaneous communication between tokens and devices. In one embodiment, a merging technique is used to coordinate the encryption and decryption of data, wherein metadata from multiple sources may be merged onto a security token. Synchronization or merging of metadata typically involves updating and replacing encryption keys. In such cases, the security token 100 provides the new cryptographic information and coordinates the encryption of data with the new information.

The rechargeable power storage 180 stores and provides power to the components of the security token 100. The rechargeable power storage 180 may include secondary batteries of many chemistries, capacitors or super-capacitors. In one embodiment, the rechargeable power storage 180 includes a Lithium Ion polymer secondary battery. The rechargeable power storage 180 may further receive power via a power interface 170.

The power interface 170 receives power from an external source by contact, capacitive, inductive or electromagnetic means. The power interface 170 includes power conversion, power management and charging circuitry. In one embodiment, the power interface 170 is connected to the rechargeable power storage 180. In a particular embodiment, the power interface includes a microSD compatible connector and an up-converter capable of powering the charging circuitry of the battery. In another embodiment, the power interface 170 may receive power from an induction charger using a dedicated electromagnetic input loop. In other embodiments, the power interface 170 may receive power from a wireless interface antenna.

The management module 160 performs security token management functions. In one embodiment, the management module 160 operates in conjunction with the metadata module 140. The management module 160 also controls power to the elements of the security token 100. The management module 160 interprets inputs from the user interface 150 and creates management messages pertaining to power module charge levels and user input requests. The management module 160 also interprets and executes directives that relate to the management of the components of the security token 100, such as those used to control communication with the secured device.

In certain embodiments, the period and duty cycle of the wireless interface 110 may be controlled by the management module 160 and may be determined based on criteria such as, security performance settings, wireless interface usage demand, security token power consumption, token workload, user input, external power availability and synchrony with the wireless interface of the secured device. The period and duty cycle may be modified respectively to discrete period values or to duty cycle values ranging up to 100% on-time. In such a case, the communication operations are referred to as increased-duty communications. Shorter communication periods and wider duty cycles may also be selected. In one embodiment, the period and duty cycle settings and available parameters are communicated to the secured device during setup of the security token 100. In certain embodiments, the security token may select a period and duty cycle to match the requirements related to the multiple secured devices. For example, the period may be selected based on the smaller common multiple of the associated frequencies and the duty cycle is matched to the longest on-time.

The user interface 150 transmits user inputs to the management module 160. In one embodiment, the user-interface may be implemented as galvanic or capacitive contacts.

The memory module 130 includes memory for use by the security token 100. In one embodiment, the memory module 130 includes memory operable via the wireless interface 110. The memory module 130 includes installation, setup and executable programs, thereby enabling partial or complete autonomous installation of security token drivers or other programs onto the secured device.

Figure 2:
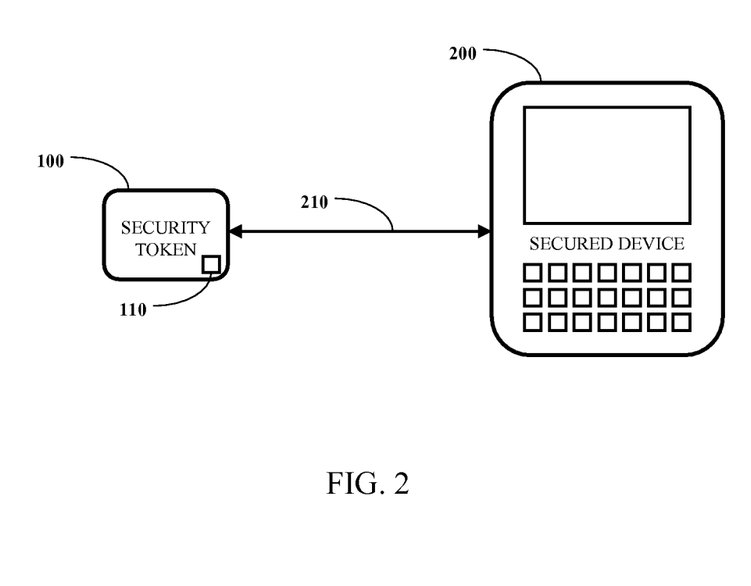
FIG. 2 is an illustration of a security token communicating with a secured device, in accordance with one embodiment of the invention.

FIG. 2 is an illustration of a security token communicating with a secured device, in accordance with one embodiment of the invention. In the illustrated example, a security token 100 is shown communicating with a secured device 200 via a wireless link 210 using the wireless interface 110. The secured device may include, but is not limited to, computers, handheld devices, mobile phones, smart phones and personal digital assistants (PDA). In operation, the security token 100 emits an authenticating and encrypted status heartbeat. The heartbeat includes encrypted signed variable nonces and identifying information. In one embodiment, the nonces may be associated with one or more secured devices depending on security performance requirements. The heartbeat also includes encrypted and signed status information such as power status and operating state. Further communication with the secured device 200 occurs during time slots related to the heartbeat. In one embodiment, heartbeat authentication occurs after a temporary seed has been created by the security token 100 and is communicated to the secured device 200. Subsequent messages from the security device 100 may use nonces generated from the seed, such that the secured device 200 may confirm that nonces have been generated from the seed. Seeds have a finite usage time and are renewed regularly or after another authentication. In one embodiment, the secured device 200 requiring communication with the security token 100 follows the heartbeat with a response created from the nonce.

Figure 3:
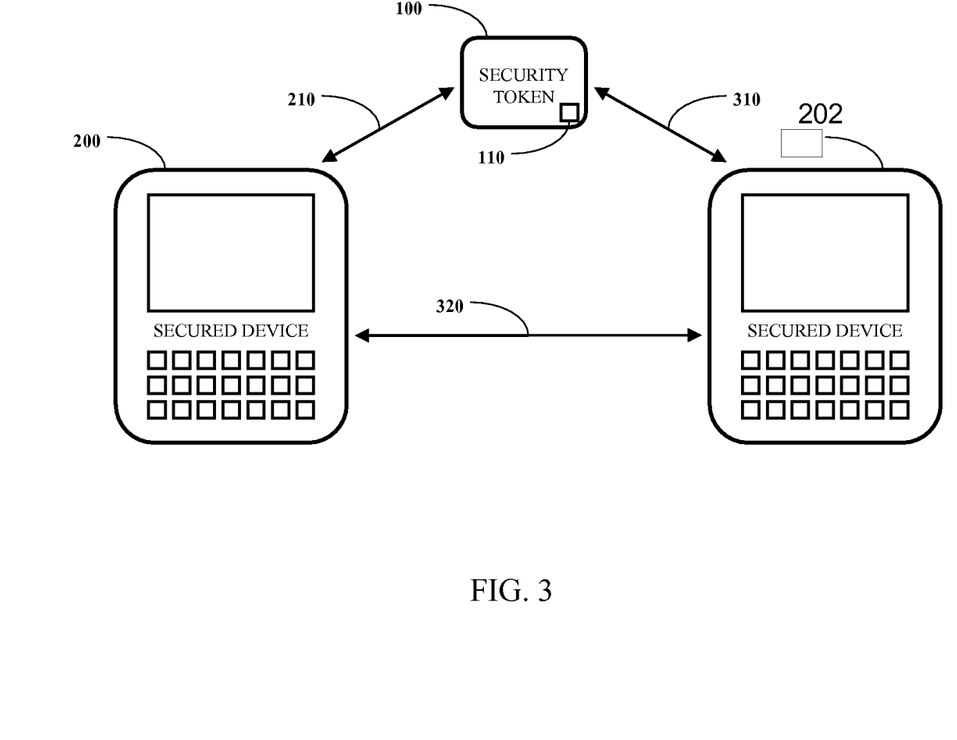
FIG. 3 is an illustration of a security token communicating with a plurality of secured devices, in accordance with one embodiment of the invention.

FIG. 3 is an illustration of a security token communicating with a plurality of secured devices, in accordance with one embodiment of the invention. In the illustrated example, a security token 100 is shown communicating with a plurality of secured devices 200 and 202 over wireless links 210 and 310 using the wireless interface 110. In one embodiment, the secured devices 200 and 202 may further exchange information between each other directly or indirectly via a communication channel 320. The communications over the wireless links 210 and 310 and the communication channel 320 may be asynchronous.

The communication channel 320 is not expected to be used for secured device metadata synchronization because of potential security problems. Instead, synchronization of metadata between secured devices uses a communication scheme wherein the token 100 resolves and propagates metadata from secured device 200 to secured device 202 (and vice versa). In cases where metadata is not to be stored in the clear on a security token, secured devices will use an encrypted messaging scheme via the security token, which stores the message until the destination device is present. Such messaging may include, for example, authenticating messages, metadata, directive messages or private messages. Authenticating messages are messages sent by secured devices to challenge and authorize each other. Metadata and directive messages are used for synchronization and remote control. Private messages include metadata that may not be shared in the clear with the security token.

Figure 4:
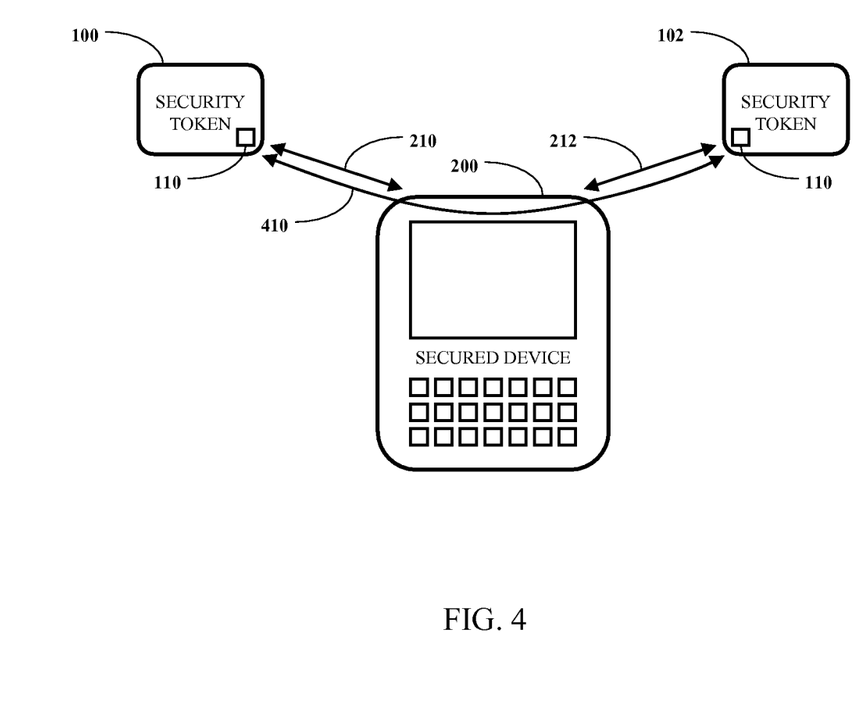
FIG. 4 is an illustration of a plurality of security tokens communicating via a secured device, in accordance with one embodiment of the invention.

FIG. 4 is an illustration of a plurality of security tokens communicating via a secured device, in accordance with one embodiment of the invention. In the illustrated example, a plurality of security tokens 100 and 102 alternatively or concurrently secure a secured device 200 using the wireless links 210 and 212, respectively. The security tokens 100 and 102 may further exchange information between each other over a communication channel 410 including the secured device 200 and the wireless links 210 and 212.

Token-to-token communication takes place concurrently via the secured device 200 if both security tokens 100 and 102 are present or alternatively if only one security token is present at a time. Although a wireless communication standard such as Bluetooth may be used for direct communications, in practice the plurality of secured devices may not be simultaneously present in all applications of the invention. Also, requiring that the plurality of security tokens be simultaneously in the presence of each other reduces the flexibility of the invention. A different communication scheme is therefore desirable. Accordingly, an embodiment of the invention requires that a secured device be included in the communication channel 410 between security token 100 and 102. Such an embodiment improves security and allows for simpler design and increased performance of the security token. Both concurrent and alternating token-to-token communication schemes use a mailbox system wherein the token 100 encrypts messages to be delivered to token 102 (and vice versa). The secured device acts as a mail box and propagates messages accordingly either upon request of security token 102 or by initiating delivery of the message to security token 102. Such messages may include, for example, authenticating messages, metadata and directive messages or private messages. Authenticating messages are messages sent by the security tokens to challenge and authorize each other. Metadata and directive messages are used for security token synchronization and remote control. Private messages include metadata that may not be shared in the clear with the secured device.

In cases where conflicting messages are addressed to a security token from multiple security tokens, priority may be given to the latest or otherwise overriding message content. For example, a resolution process may be used similar to metadata synchronization.

In token-to-token communication, each security token uses its private and public keys as well as a shared symmetric key to encrypt messages in order to guarantee secure token-to-token communication.

Figure 5:
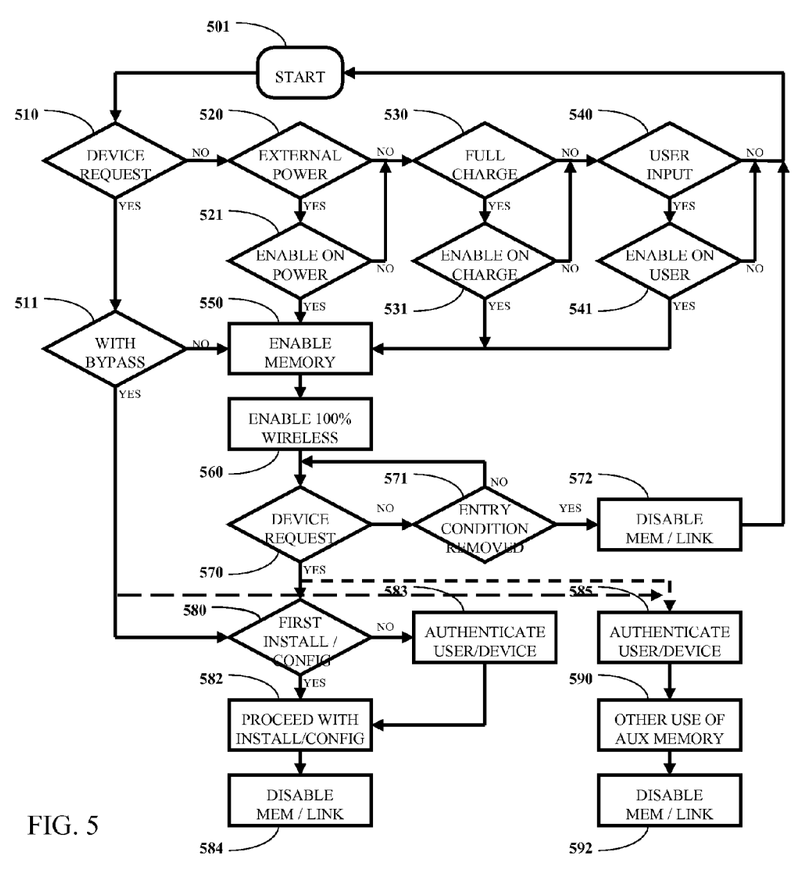
FIG. 5 illustrates a technique by which a security token enables full duty of its wireless interface and memory module, in accordance with one embodiment of the invention.

FIG. 5 illustrates a technique by which a security token is configured and software is installed on a secured device in accordance with an embodiment of the invention. Referring to FIG. 5, a start block 501 is shown. Device configuration may be initiated upon request from a secured device 510. If the request is accompanied with a bypass instruction 511, it is determined whether it is the first installation or configuration 580. If there is no bypass directive, the memory is enabled 550 and a full duty cycle is enabled 560. Afterwards, a check is made for a device request 570. If there is a device request, block 580 is invoked. If there is no device request, a check is made to determine whether an entry condition is removed 571. If not, control returns to block 570. If so, the memory link is disabled 572 and control returns to block 501.

Device configuration may also be initiated based on the availability of external power 520, based upon a specified charge level (e.g., full) 530 or based on user input 540. The triggers 520, 530 and 540 may be enabled by their respective directives, enable on power 521, enable on charge 531 and enable on user input 541. A set of default directives are provided at manufacturing, those directives may be later modified by the user. A full duty cycle of the wireless interface 560 and the memory module 550 is then enabled.

Returning to block 580, if it is the first installation or configuration, the installation and configuration commences 582 and then the memory link is disabled 584. If it is not the first installation, the user or device is authenticated 583 and control proceeds to block 582.

FIG. 5 also illustrates the use of the auxiliary memory outside of installation and configuration applications for which all blocks 501 through 572, the dotted alternatives path and blocks 585 through 592 are applicable. In such use of the auxiliary memory, control at the output of block 510 may proceed to authentication at block 585. If the device request is accompanied with a bypass instruction, control from block 511 may proceed to authentication block 585. Another use or auxiliary memory may then be enabled 590. Afterwards, the memory and link are disabled 592.

Prior to installation, the device features adequate low level drivers for wireless interface. In the case of Bluetooth, the security token is designed such that most devices support its default Bluetooth profile. Security token Bluetooth profiles other than the default may be selected later if need be and after further driver installation. In an alternative embodiment, a wired interface may be provided for installation, however most devices today support adequate Bluetooth profiles.

During the installation process, the security token provides the secured device with installation code or instructions. Installation code or instructions are then executed by the secured device to install security token driver and application programs. The auxiliary memory of the security token and the installation process resolve one aspect of securing an occasionally connected computing (OCC) device by allowing an autonomous use of the security token from the start (e.g., installation).

Configuration refers to the process of defining the operating parameters of the security token. The resulting parameter values are collectively referred to as "Configuration". Some Configuration parameters are set by design or for a class of applications of the security token. Such parameter may or may not be modified during the configuration process or otherwise by the user, software or application.

In one embodiment, a portion of the memory module 130 may be accessed by the secured device as additional memory storage or may hold related or unrelated software programs other than the installation code or instructions.

Figure 6:
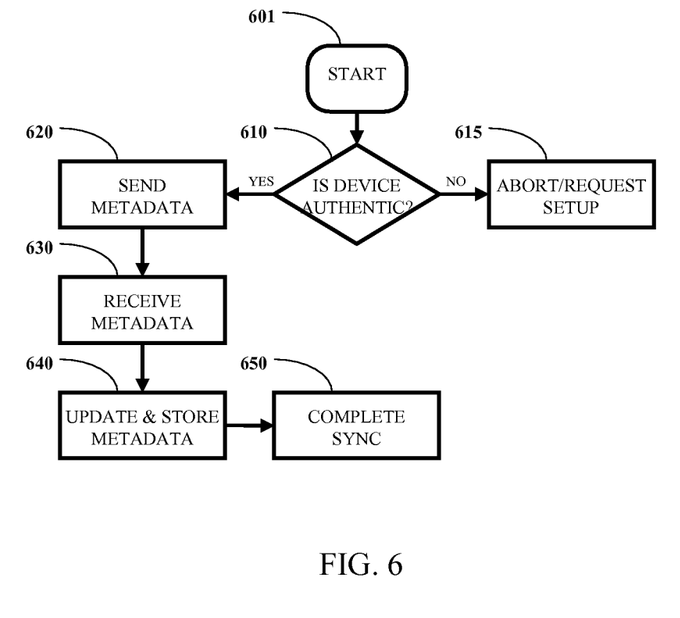
FIG. 6 illustrates a technique by which a security token synchronizes metadata.

FIG. 6 illustrates a technique by which a security token synchronizes metadata. In an exemplary operation, control starts at block 601. The security token then checks if the secured device is authenticated 610. If the secured device is not authenticated, the synchronization is aborted and device setup 615 is requested. If the secured device is authenticated, the security token sends metadata 620, receives metadata 630, updates and stores metadata 640 and completes the synchronization process 650. In one embodiment, updating metadata includes resolving conflicts between old and new metadata.

Metadata may be shared between secured devices and security tokens; metadata may also be exclusive to secured devices or to security tokens. In either case, synchronization is required to resolve encryption conflicts, update metadata or propagate directives to a plurality of secured devices or security tokens.

In block 620, the security token provides metadata to be synchronized to either a secured device or a security token, as applicable. The security token then receives new metadata in block 630. The new metadata consist of resolved metadata or unresolved metadata depending of the stage in the synchronization process. The security token may then resolve metadata synchronization conflicts as applicable in the update block 640. Completing synchronization may involve further exchange of metadata in case resolution was performed on the security token in block 640.

Figure 7:
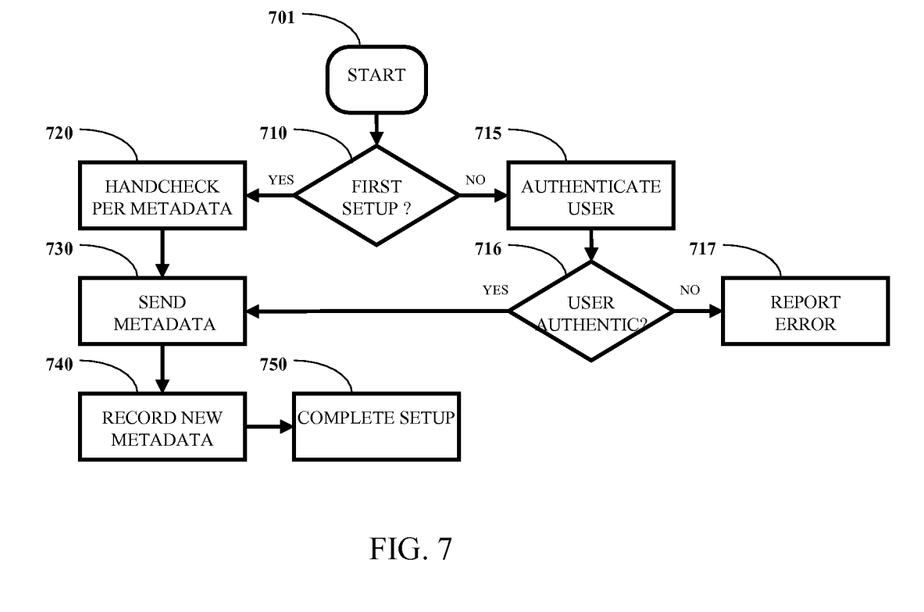
FIG. 7 illustrates a security setup technique in accordance with one embodiment of the present invention.

FIG. 7 illustrates a security setup technique in accordance with one embodiment of the present invention. The purpose of the setup procedure is to create the initial metadata and directive. In contrast with the configuration process which affects operating parameters of the security token, setup is used for a more granular customization and management of an application. Setup affects an initial set of metadata related to specific device and token usage, including without limitation: Secured Device and Security Token identifications, Secured Device Certificates, Private and Public Key issuance, and List of Setup security tokens and secured device.

Control starts at block 701. The security token checks if this is the first setup 710. If this is the first setup, the token proceeds with a hand check 720 if instructed by the metadata directives. If not, the user's credentials are checked and the user is authenticated 715. If the user authentication fails 716, a report error 717 is generated. Upon successful authentication, the token sends the setup metadata to the secured device 730 and receives and records new metadata 740. The token then completes the security setup 750. The metadata sent during setup may include parameters such as cryptographic information for the secured device as per the metadata directives and key pairs, the secured device and token identifying information, private and public keys, session keys and a list of setup secured devices and tokens. Note that an authenticated user may also change the setup credentials on the security token.

In one embodiment, the setup hand check 720 is implemented as follows. The security token is pre-programmed with a pass code. The pass code is communicated to the user for example via a removable label on the security token or via a note packaged with the security token. The user then uses the pass code as a one-time password during the setup of the security token. The pass code is valid until the first setup is completed. The pass code is subsequently replaced by user credentials and recorded as part of the new metadata.

In another embodiment, authentication mechanisms based on challenge-response authentication schemes may also be implemented. In one embodiment, a secured device authentication may be implemented, wherein the security token generates and signs a challenge, sends it to the secured device and receives from the secured device a signed response created from the challenge. Alternatively, a security token authentication may be implemented, wherein the security token responds to challenge messages from the secured device by creating a response from the challenge.

Figure 8:
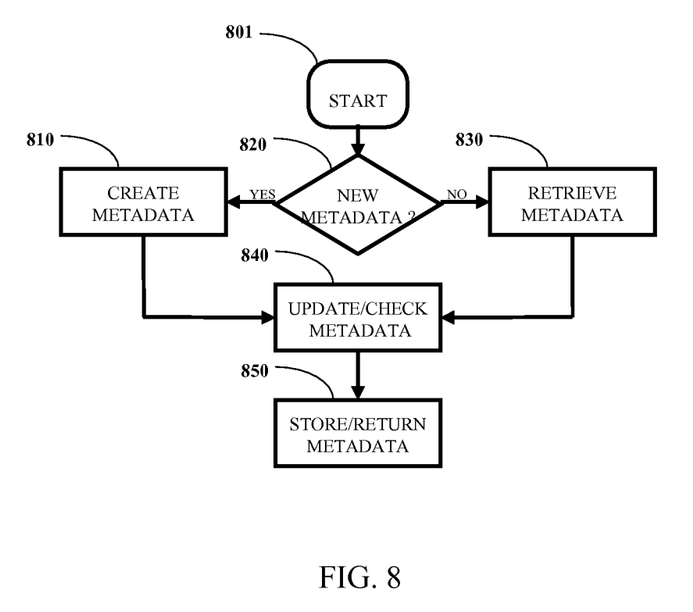
FIG. 8 illustrates a technique by which a security token coordinates encryption, in accordance with one embodiment of the present invention.

As discussed above, during the synchronization of metadata or the copy of protected data, a technique of coordinating encryption data is desired. FIG. 8 illustrates a technique by which a security token coordinates encryption in accordance with one embodiment of the present invention. In one embodiment, the cryptographic module 120 coordinates the encryption of data.

Referring to FIG. 8, control starts at block 801 and the security token creates encryption metadata including keys 810 when new metadata is required 820. If metadata already exists, it is retrieved 830. The metadata is checked and updated 840, stored and returned 850. Key generation details such as the type of key or key pair and the bit length or algorithm may be described by default metadata or by metadata associated with the data, the secured device, the application, policies and other operating parameters.

The ability of a security token to create cryptographic information autonomously and to follow propagating directives resolves issues associated with limited or inadequate cryptographic resources on the secured device. It also resolve issues associated with a lack of network connection such as in OCC environments (in applications when such connection is required) and with the alternating presence of multiple security tokens or secured devices.

The ability of a security token to create cryptographic information autonomously and to follow propagating directives further implements a user centric security system as opposed to relying on a central authority to control encryption keys. With such security token capabilities, users are enabled to control security of data on a secured device in a manner independent of a central authority or other third party.

Figure 9:
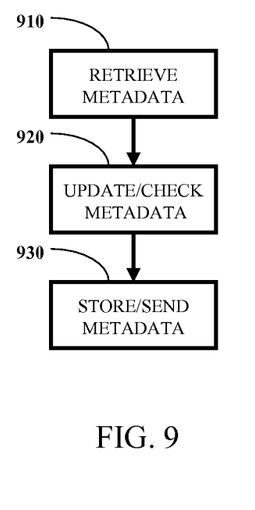
FIG. 9 illustrates a technique by which a security token coordinates decryption in accordance with an embodiment of the invention.

FIG. 9 illustrates a technique by which a security token coordinates decryption. In one embodiment, the cryptographic module 120 coordinates the decryption of secured device data by retrieving the synchronized decryption keys and associated metadata 910, checking and updating metadata 920 and storing and sending the metadata 930, including the decryption key to the secured device. In one embodiment, the decryption keys may be symmetric or asymmetric. Symmetric keys include, but are not limited to, session keys and data or metadata encryption keys. These keys may be symmetric either on the secured device or on the security token. Asymmetric decryption keys include, but are not limited to, keys used for transferring keys and verifying signatures or keys for decrypting protected symmetric keys, data or metadata. In one embodiment, the asymmetric decryption keys are not private and may be communicated to the secured device based on the metadata directives.

Metadata elements are distributed amongst the security token and the secured device such that decrypting elements are stored on the security token. The secured device uses the decrypting elements temporarily, keeping it in volatile memory and discarding it promptly after use. An alternative technique consists of keeping a decrypting element (Kd2) as metadata private to security tokens. In such cases, the decrypting element may only be transferred securely between security tokens during synchronization, but kept secret from the secured device. The use of the private decrypting element (Kd2) is then reserved to a security token. For this scheme to be secure, a 2-stage asymmetric encryption is performed, whereby the secured device holds an encrypted version of the data decrypting element (K1); the encrypted element Kd1 may be sent to the security token for decryption using Kd2 and securely returned to the secured device. The secured device still has the public encrypting element (Ke2) to encrypt the decrypting element (Kd1). Use of a symmetric key instead of a 2-stage asymmetric scheme reduces security since the secured device also needs to use the data encrypting element when the security token is not available. When the security token is not in proximity of the secured device, the secured device does not have access to decrypting keys. Data is therefore encrypted and secure.

In an embodiment of the invention, data is accessed via third party application programming interfaces (API). This technique as opposed to disk encryption or otherwise file based encryption, allows for the third party application to run un-interrupted even if the security token is not available and little application management is required. An embodiment of the invention includes manipulating clear data in volatile memory only. Although it would be apparent to those skilled in the art that the use of non-volatile memory does not affect many aspects of the invention, reserving volatile memory for clear data increases security performance since a secured device may simply discard clear data via power cycling.

The coordination of encryption and decryption of data may be used in a variety of applications, such as, for example, in a data transaction process performed by the security token. A data transaction may transfer user data, electronic documents, electronic information with monetary value, an electronic representation of a monetary value or an electronic representation of an agreement between parties, such as a material or financial transaction. In one embodiment, the first party and metadata are referred to as source and the second party and metadata are referred to as destination. The data transaction may be initiated by the destination party ("pull") or by the source party ("push"). A "push" transaction involves the authorization and enrollment of the source party by the destination token. A "pull" transaction involves the authorization and enrollment of the destination party by the source token. Further use of the source token and the destination token depends on metadata directives and configuration parameters. In one embodiment, the source data is encrypted in conjunction with the source security token. The destination data is then decrypted and encrypted by the source security token in conjunction with the destination security token. The selection of the encryption technique may be determined by the destination token in conjunction with metadata directives or configuration parameters. The metadata may also be created or altered by the security token to convey directives associated with the transferred data and the data of origin. The security token also records transaction related information such as the existence, completion, subject and date of the transaction, enrollment and authorization information.

As will be appreciated by those skilled in the art, the disclosed technique of enabling the coordination of the encryption and decryption of data via a security token using metadata and information associated with the secured device enables the development of a user-centric distributed security system. This is in contrast to prior techniques of implementing security, wherein the encryption and decryption of data is typically controlled using a top-town approach involving the need for a connection between an overseeing authority and a secured device.

Figure 10:
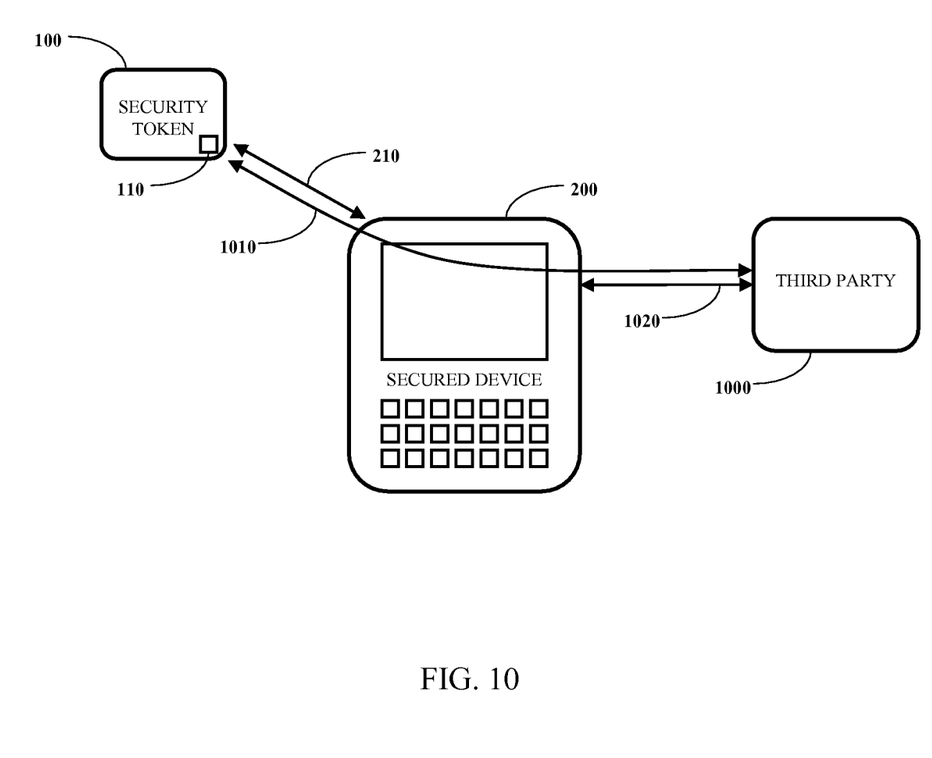
FIG. 10 illustrates a security token communicating with a third party via a secured device.

In certain embodiments, the security token may operate within a multi-user environment. FIG. 10 illustrates a security token communicating with a third party via a secured device. Referring to FIG. 10, the security token 100 communicates with a third party 1000 via a channel 1010 including the secured device 200, the wireless link 210 and a communication channel 1020 between the secured device 200 and the third party 1000. As illustrated, the communication channel 1020 and the third party 1000 may be external or internal to the secured device 200. In one embodiment, the third party includes another user. In another embodiment, the third party may also include a computer, device, token or application running on the secured device or on another computer or device.

Similar to token-to-token communication, communication to a third party includes the secured device acting as a mail box buffering messages. This technique allows third party messages to be propagated to security tokens and secured devices that are not simultaneously present when a direct communication with the third party is occurring.

In one embodiment, a third party enrollment procedure is disclosed that enables a given security token to acquire information such as hashes, credentials, keys, certificates, signatures or directives from a third party, create related information such as cryptographic, privilege and management metadata and deliver status and cryptographic information. In one embodiment, the acquired and created information is collectively referred to as enrollment information. The enrollment information may then be encrypted in part or in whole, used by the security token or provided by the security token. In an exemplary operation, a security token receives an enrollment message from a secured device on behalf of a third party. The security token checks the user's credentials and third party certificates as applicable in accordance with the metadata directives. In one embodiment, the security token challenges the third party and provides its public key to the third party.

The security token may authorize the third party in a variety of ways as determined by the purpose and nature of the third party. In one embodiment, the security token receives an authorization message, creates authorization information including cryptographic, directive and management metadata, records authorization information and transmits the authorization information. If the third party is a user, the user's credentials may be checked against enrollment information. If the third party is capable of cryptographic computation, a challenge-response authorization scheme may be used after the security token generates a challenge message using enrollment information, a newly created challenge seed and private cryptographic information. Third party authorization is required for security token operations controlled by a third party. The secured device may also take advantage of a third party authorization performed by the security token. For example, some related operations on the secured device may be controlled by a third party. Alternately, other operations, such as communication with a third party over the communication channel 1020 may be contingent upon the authorization of the third party by the security token. Establishing anti-phishing measures would be an application of the latter example.

In another embodiment, a third party revocation procedure is implemented to remove or diminish the privileges of a given third party (the revoked party). The third party may be revoked by a user or by another third party with adequate privileges (the revoking party). Further, the third party revocation may be direct or indirect via another security token. Direct third party revocation includes authorizing the revoking party via the security token, and updating the enrollment information of the revoked party accordingly with the authorization information via the security token. Indirect third party revocation includes performing metadata synchronization via security tokens, as discussed above. When the revoked party is a managing party (discussed below), metadata synchronization is carried out by the security token affecting the metadata associated with the revoked party. Such synchronization is controlled by the metadata directives associated with the revoked party.

In certain embodiments, security token metadata may be managed by more than one party. Such a party is referred to as a managing party. In one embodiment, the managing parties may include the user or parties associated with the data or applications. In one embodiment, metadata may be accessed by a managing party of adequate privilege (the auditing party) via a security token audit process. The security token audit process enables remote management of a security token and the associated metadata. In one embodiment, a direct security token audit process is disclosed that includes authorizing the auditing party via the security token and then delivering metadata according to the authorization information via the security token. In another embodiment, an indirect security token audit is disclosed that includes authorizing the auditing party via a first security token, synchronizing metadata with a second security token via the first security token and delivering metadata according to the authorization information via the second security token.

In one embodiment, the security token audit process includes a security token ping procedure, wherein the availability, authenticity or authorization of the security token is queried. The security token ping procedure may be direct or indirect. During normal communication operation of the security token, the security token pings may be externally buffered. For real time requirements, an increased-duty communication operation is performed prior to initiating the security token ping procedure.

In another embodiment, metadata may be created or altered by a managing party of adequate privilege (the controlling party) via a security token control process. Security token control enables remote management of the security token and the associated metadata. Further, security token control may be direct or indirect via a second security token. In one embodiment, a direct security token control process is implemented wherein the security token authorizes the controlling party and creates and alters (or updates) the metadata to be controlled according to the authorization information. Indirect security token control may be performed by security tokens via the metadata synchronization process, discussed above.

The managing parties may further be enrolled and authorized by the security token, as discussed with respect to the multi-user operating procedures disclosed in connection with FIG. 10. In a particular embodiment, third party management includes a security token enrollment procedure, a security token authorization procedure and a security token revocation procedure, as will be discussed in greater detail below.

The security token enrollment procedure involves enrolling a security token by a user or a managing party (the enrolling party). The token enrollment may be direct or indirect via a second security token. In one embodiment, a direct security token enrollment procedure is disclosed that includes receiving an enrollment message from a secured device on behalf of the enrolling party, wherein the security token verifies user credentials and the enrolling party certificates as applicable and in accordance with the metadata directives. The direct security token enrollment procedure further includes updating metadata, delivering status and cryptographic information associated with the security token and recording enrollment information in the form of metadata associated with the enrolling party via the security token. In another embodiment, an indirect token enrollment procedure is disclosed that includes a first security token completing a direct enrollment by an enrolling party and completing metadata synchronization with a second security token. The indirect token enrollment procedure further includes delivering status and cryptographic information via the second security token.

The security token authorization procedure involves authorizing a security token for a user or a managing party (the authorizing party). Security token authorization may be direct or indirect via a second security token. In one embodiment, the security token provides cryptographic information via the communication channel to the authorizing party. The security token responds to a challenge message from the authorizing party by creating a response from the challenge message and encrypting the response with its private key and with a shared key included in the enrollment information. The security token may receive authorization information such as cryptographic, directive and management metadata and information about the authorization process and the authorizing party from the authorizing party.

A given security token may also be revoked by a user or a managing party with adequate privilege (the token revoking party). The security token revocation procedure may be direct or indirect via a second security token. Token revocation ensures that a revoked security token is not used in conjunction with data or a secured device or for other purposes. An indirect token revocation procedure may be used in the case of a loss of control of a security token. In one embodiment, token revocation involves modifying the metadata. This metadata is referred to as revoked metadata. Token revocation further includes modifying the secured device data in order to use metadata that is different from the revoked metadata. Such further modification of data may be carried out using the techniques of metadata synchronization and encryption and decryption coordination as discussed above. For direct security token revocation, the security token authorizes the token revoking party and updates the metadata to be revoked accordingly with the authorization information.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A security token, comprising:
   a wireless interface to communicate with a secured device and an additional security token; and
   a cryptographic module to:
      generate cryptographic information,
      encrypt messages to the secured device,
      decrypt messages from the secured device,
      coordinate the encryption and decryption of data on the secured device, wherein movement of the security token beyond a range of the wireless interface to communicate with the secured device ceases coordination of decryption of data on the secured device such that the data on the secured device remains encrypted, wherein the wireless interface communication range with the secured device is up to 2 meters; and
      exchange encryption parameters with the secured device and the additional security token, wherein the secured device operates as a communication channel between the security token and the additional security token.

2. The security token of claim 1 in combination with a secured device selected from a handheld device, a mobile telephone, a personal digital assistant, a smart telephone and a computer.

3. The security token of claim 1 further comprising a rechargeable power storage element.

4. The security token of claim 1 configured to receive power from an external source.

5. The security token of claim 1 wherein the encryption parameters are selected from cryptographic information, information associated with the secured device, data and applications on the secured device, information associated with users of the secured device and synchronizing information.

6. The security token of claim 1 wherein the cryptographic information is selected from symmetric keys and asymmetric keys.

7. The security token of claim 1 wherein the asymmetric keys are selected from Diffie-Helman compatible key pairs and RSA compatible key pairs.

8. The security token of claim 6 wherein the symmetric keys are AES compatible keys.

9. A method of operating a wireless security token to secure data on a secured device, comprising:
   generating encryption information;
   encrypting messages to the secured device;
   decrypting messages from the secured device;
   coordinating encryption and decryption of data on the secured device when the wireless security token is within a wireless interface communication range with the secured device, wherein the wireless interface communication range with the secured device is up to 2 meters; and
   ceasing coordination of decryption of data on the secured device when the wireless security token is outside the wireless interface communication range with the secured device such that the data on the secured device remains encrypted; and
   exchanging encryption parameters with the secured device and an additional security token, wherein the secured device operates as a communication channel between the security token and the additional security token 10. The method of claim 9 further comprising using metadata to specify encryption parameters.

11. The method of claim 10 further comprising using the security token to synchronize metadata.

12. The method of claim 9 wherein operating the security token comprises using directives to control the security token.

13. The method of claim 9 further comprising utilizing private and public keys on the security token and the additional security token to guarantee secure token-to-token communication.

14. The method of claim 9 further comprising storing a message on the secured device until the additional security token is proximate to the secured device.

15. The method of claim 9 further comprising enrolling a party, wherein the party is selected from a user, a secured device, a security token and a software program.

16. The method of claim 15 further comprising authorizing an enrolled party for a designated purpose.

17. The method of claim 9 further comprising using the security token to exchange data between users.

18. The method of claim 9 further comprising using the security token to record a transaction.

19. The method of claim 9 further comprising controlling security token metadata and directives.

* * * * *